UNITED STATES PATENT OFFICE.

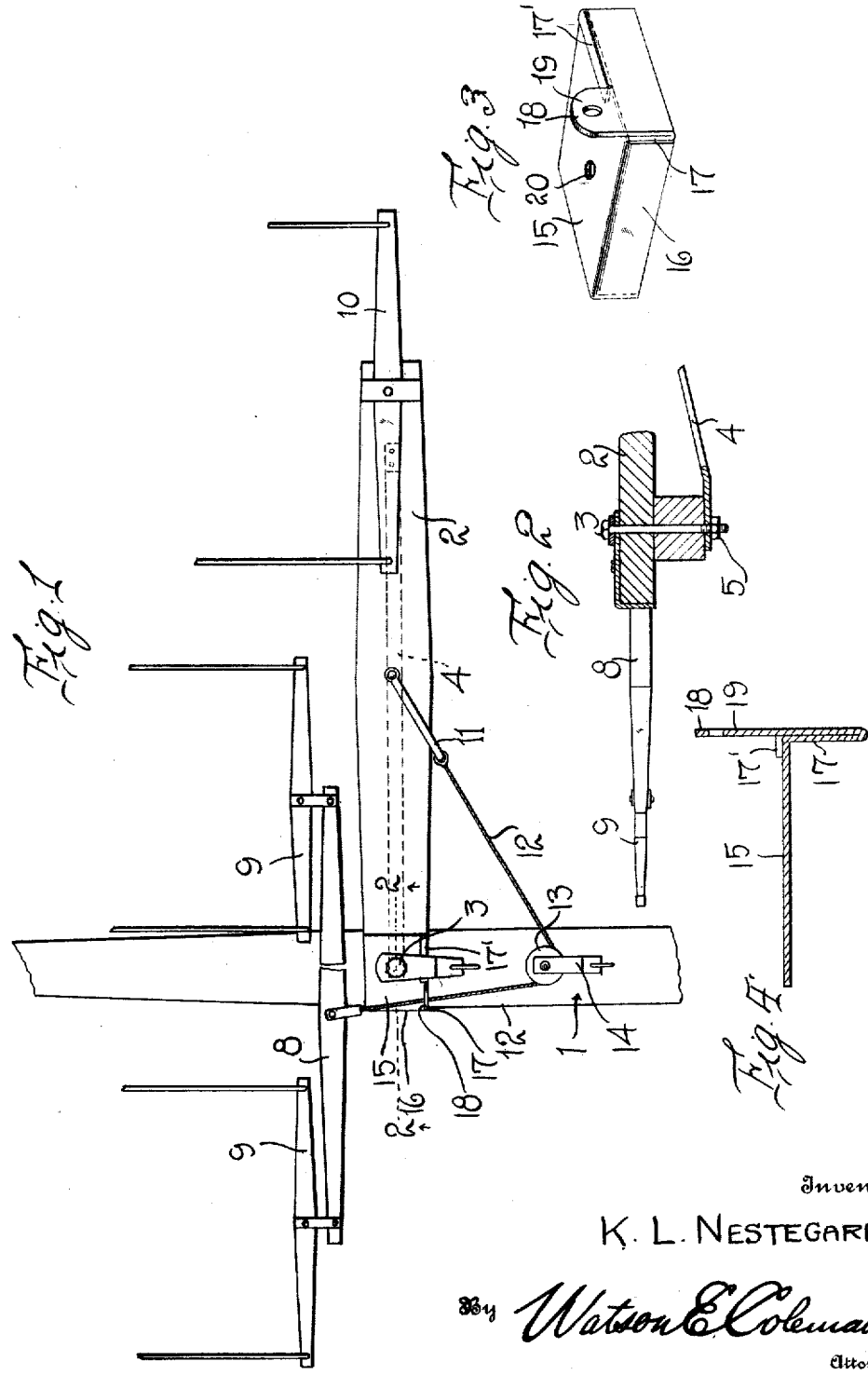

KNUT LARSEN NESTEGARD, OF KNAPEN, ALBERTA, CANADA.

DRAFT-EQUALIZER.

1,267,106.　　　　Specification of Letters Patent.　　Patented May 21, 1918.

Application filed March 28, 1917. Serial No. 158,029.

*To all whom it may concern:*

Be it known that I, KNUT L. NESTEGARD, a subject of the King of England, residing at Knapen, in the Province of Alberta and Dominion of Canada, have invented certain new and useful Improvements in Draft-Equalizers, of which the following is a specification, reference being had to the accompanying drawings.

This invention relates to draft equalizers and more particularly to a three-horse equalizer.

It is the primary object of my invention to provide a device for the above purpose, whereby the draft is equally distributed between the several animals and a more even and uniform pull on the vehicle thus obtained.

It is a more particular object of my invention to provide an equalizer of the above type embodying a main equalizer bar pivotally mounted at one of its ends upon the tongue of the vehicle and having a swingletree connected to its other end, a doubletree extending over the tongue and provided with a whiffletree on each end, and connecting means between said equalizer bar and the doubletree whereby the draft will be equally distributed between the several animals.

It is an additional object of my invention to provide equalizing means including a flexible connection between the equalizer bar and the doubletree, and a cap plate secured upon the pivoted end of the equalizer bar and provided with guide means for said flexible connection.

It is still another object of the invention to provide a very simple and durable construction of the several elements of the device whereby the same may be very positive and reliable, and efficient in practical operation.

With the above and other objects in view, my invention consists in the novel features of construction, combination and arrangement of parts to be hereinafter more fully described, claimed and illustrated in the accompanying drawing, in which, Figure 1 is a plan view of a draft equalizer constructed in accordance with the invention;

Fig. 2 is a sectional view on the line 2—2 of Fig. 1;

Fig. 3 is a detail perspective of the cap plate;

Fig. 4 is a sectional view through the plate.

Referring in detail to the drawing wherein I have illustrated the preferred embodiment of my invention, 1 designates the tongue or pole of the vehicle and 2 the equalizer bar which is pivotally mounted at one of its ends upon a vertical bolt 3 extending through the tongue and said bar. A brace or truss rod 4 is secured at one end adjacent to the free end of the bar 2 upon the under side thereof, and has its other end engaged upon the lower end of the bolt 3 and securely clamped against the tongue 1 by means of a nut 5 threaded upon said bolt.

8 designates a doubletree which extends across the tongue or pole 1 in advance of the pivoted end of the equalizer bar 2, and to opposite ends of this doubletree the whiffletrees 9 are connected in any ordinary or approved manner. A swingletree 10 is also mounted upon the free end of the bar 2. The draft animals are attached to the whiffletrees and the swingletree in the usual manner.

The ends of a yoke 11 are pivotally connected centrally to the equalizer bar 2, and a cable or other flexible element 12 has one of its ends attached to the medial portion of said yoke, said cable passing around the guide sheave or pulley 13 mounted between a bracket plate 14 and the upper face of the tongue 1.

Upon the pivoted end of the equalizer bar 2, a cap plate indicated generally by the numeral 15, is engaged. This plate has an angular flange 16 formed on one end to abut against the end of the bar 2, and a similar flange 17 is also formed on one longitudinal edge of the plate, said flange being bent upon itself and upwardly extended. Upon one end of this upwardly extending portion of the flange 17, the upstanding lug or ear 18 is formed and projects above the surface of the cap plate. This ear is provided with an opening 19 therein through which the cable or flexible member 12 extends. The upper edge of the flange 17 is angularly disposed and bent inwardly and downwardly, as at 17', upon the cap plate. The plate 15 is formed at its approximate center with an opening 20 to receive the bolt 3. This metal cap plate on the pivoted end of the equalizer bar provides a reinforcement therefor and, at the same time, serves as a guide, by the provision of the apertured lug 19, for the flexible connection 10.

From the above description, taken in connection with the accompanying drawing, the construction, manner of operation and several advantages of the device will be clearly understood. It will be manifest that upon a greater pull of the animal connected to the swingletree 10 than the animals connected to the whiffletrees 9, the equalizer bar 2 will be turned upon the pivot bolt 3 and the flexible element 12 connected to the medial portion of said bar will be drawn around the guide sheave 13 and pull the doubletree 8 and the whiffletrees rearwardly so that the animals connected thereto will be caused to assume their share of the draft. Contrariwise, upon a stronger pull by the animals connected to the whiffletrees 9, the free end of the equalizer bar 2 carrying the swingletree 10 will be moved in a rearward direction so that the animal connected to this end of the equalizer bar will perform its part of the work. It will thus be seen that I have devised a very simple and efficiently operating equalizer which is well adapted for the intended purpose. The invention may obviously be produced at comparatively small cost and readily applied to the ordinary vehicle without entailing a great amount of expense.

While I have shown and described the preferred construction and arrangement of the several elements, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

In a draft equalizer, the combination with a draft tongue or pole, of an equalizer bar pivotally mounted at one of its ends upon the tongue and extending entirely upon one side thereof, a swingletree on the free end of said bar, a doubletree disposed in advance of the pivoted end of the bar, whiffletrees on the ends of said doubletree disposed upon relatively opposite sides of the tongue, a flexible element centrally connected to the equalizer bar and to said doubletree, a pulley mounted upon the tongue rearwardly of the equalizer bar around which said flexible element extends, a metal cap plate on the pivoted end of the equalizer bar having angularly disposed flanges engaged upon the end edge and the rear longitudinal edge of said bar, said latter flange being formed with an upstanding lug having an opening therein through which said flexible element is disposed.

In testimony whereof I hereunto affix my signature in the presence of two witnesses.

KNUT LARSEN NESTEGARD.

Witnesses:
W. A. LEVITT,
O. B. EDGETT.

Copies of this patent may be obtained for five cents each, by addressing the "Commissioner of Patents, Washington, D. C."